(12) United States Patent
Lee

(10) Patent No.: US 6,510,537 B1
(45) Date of Patent: Jan. 21, 2003

(54) SEMICONDUCTOR MEMORY DEVICE WITH AN ON-CHIP ERROR CORRECTION CIRCUIT AND A METHOD FOR CORRECTING A DATA ERROR THEREIN

(75) Inventor: Jin-Yub Lee, Seoul (KR)

(73) Assignee: Samsung Electronics Co., Ltd, Gyeonggi-Do (KR)

( * ) Notice: Subject to any disclaimer, the term of this patent is extended or adjusted under 35 U.S.C. 154(b) by 0 days.

(21) Appl. No.: 09/370,938

(22) Filed: Aug. 9, 1999

(30) Foreign Application Priority Data

Aug. 7, 1998 (KR) .............................. 98-32236

(51) Int. Cl.[7] .................... G11C 29/00; H03M 13/00
(52) U.S. Cl. ....................................... 714/763; 714/758
(58) Field of Search ................................ 714/763, 758, 714/756, 807

(56) References Cited

U.S. PATENT DOCUMENTS

| | | | | |
|---|---|---|---|---|
| 3,755,779 A | * | 8/1973 | Price .......................... | 714/772 |
| 4,201,337 A | * | 5/1980 | Lewis et al. ................ | 714/785 |
| 4,736,376 A | * | 4/1988 | Stiffler ........................ | 714/785 |
| 4,958,350 A | * | 9/1990 | Worley, III et al. ......... | 714/755 |
| 5,056,095 A | * | 10/1991 | Horiguchi et al. .......... | 714/765 |
| 5,216,633 A | | 6/1993 | Weon et al. | |
| 5,226,043 A | * | 7/1993 | Pughe et al. ................ | 714/768 |
| 5,491,702 A | * | 2/1996 | Kinsel ......................... | 714/753 |
| 5,592,499 A | * | 1/1997 | Tanoi .......................... | 714/773 |
| 5,696,717 A | | 12/1997 | Koh | |
| 5,920,580 A | * | 7/1999 | Mick ........................... | 714/765 |
| 6,024,485 A | * | 2/2000 | Yoshida et al. ............. | 714/784 |

FOREIGN PATENT DOCUMENTS

| | | |
|---|---|---|
| GB | 2289779 A | 11/1995 |
| GB | 2048529 A | 12/1999 |

OTHER PUBLICATIONS

Wicker (Stephen B. Wicker, "Error Control Systems for Digital Communication and Storage", Prentice–Hall, 1995).*

* cited by examiner

*Primary Examiner*—Albert Decady
*Assistant Examiner*—Joseph D. Torres
(74) *Attorney, Agent, or Firm*—Marger & Johnson & McCollom, P.C.

(57) ABSTRACT

Disclosed is semiconductor memory device and a method for correcting a data error therein. The device comprises a memory cell array that stores a plurality of data bits and a plurality of check bits corresponding to the plurality of data bits. A read circuit is further provided that performs an operation of reading out the plurality of data bits and the plurality of check bits from the memory cell array. The semiconductor memory device further comprises error circuits for correcting a first error in the data bits of the first group and a second error in the data bits of the second group, respectively. The error circuit receives in parallel odd-numbered and even-numbered data and check bits read out from the memory cell array during a first cycle of a read mode of operation and generates first syndrome bits and second syndrome bits. During a second cycle of the read mode of operation, the circuit corrects the error in the odd-numbered data bits and the error in the even-numbered data bits responsive to the first and the second syndrome bits, respectively.

5 Claims, 13 Drawing Sheets

SEMICONDUCTOR MEMORY DEVICE WITH AN ON-CHIP ERROR CORRECTION CIRCUIT AND A METHOD FOR CORRECTING A DATA ERROR THEREIN

FIELD OF THE INVENTION

The present invention relates to a semiconductor memory device and, more particularly, to a semiconductor memory device with an on-chip error correction circuit capable of improving the access time and a method for correcting a data error stored therein.

BACKGROUND OF THE INVENTION

In many semiconductor memory devices, particularly flash memory devices, a cell array is provided that comprises electrically erasable and programmable read only memory cells (EEPROM cells) each having a floating gate. Storing charge in the floating gate of the respective EEPROM cells allows a threshold voltage of each of the EEPROM cells to be electrically altered between low and high level values to represent a logic 1 and a logic 0, respectively. Semiconductor devices utilizing floating gate technology do not have an intrinsic problem with data retention. However, since the high energetic electron injection and emission mechanism used for write and erase operations result in the generation of defects and traps in the tunnel oxide of the devices, reliability problems surface during read and write cycles. Stored electrons can leak away from the floating gate through the tunnel oxide defects and traps. On the other hand, the floating gate slowly gains electrons when the control gate of the EEPROM cell is maintained at the power supply voltage during the read cycle. Charge losses and gains result in an increase and decrease, respectively, in the threshold voltage of the EEPROM cell transistor. These charge losses and gains may result in random bit errors.

In general, an error correcting code/circuit (ECC) is employed for improving the reliability of the flash memory devices. A typical ECC corrects errors using a controller. However, an EEC is needed that is on-chip and capable being used in a card system that does not support the controller. Placing the ECC on a chip is more profitable than placing the ECC in the controller because doing so reduces fabrication costs. On-chip ECC technology is discussed in the IEEE JOURNAL OF SOLID-STATE CIRCUITS, vol. 32, No. 5, May 1997, entitled "A COMPACT ON-CHIP ECC FOR LOW COST FLASH MEMORIES", which is hereby incorporated by reference.

FIG. 1 is a block diagram of a conventional semiconductor memory device having an on-chip ECC. The semiconductor memory device of FIG. 1 comprises a memory cell array 10 that stores a plurality of data bits and a plurality of check bits (or redundant bits) corresponding to the plurality of data bits. For simplicity, a well-known NAND type flash memory device will be described as an example. Flash memory cells provided in the NAND type flash memory device are more fully disclosed in U.S. Pat. No. 5,696,717, entitled "NONVOLATILE INTEGRATED CIRCUIT MEMORY DEVICES HAVING ADJUSTABLE ERASE/PROGRAM THRESHOLD VOLTAGE VERIFICATION CAPABILITY", which is hereby incorporated by reference.

As illustrated in FIG. 1, the memory cell array 10 is divided into a plurality of input/output (I/O) memory blocks IOMBi (for example, i=1–8) in accordance with an I/O data width (for example, X8). A plurality of word lines WLi are arranged in a plurality of rows through the I/O memory blocks IOMB1–IOMB8, respectively. In each I/O memory block IOMB1–IOMB8, a plurality of bit lines BLm (for example, 512 bit lines) and a plurality of parity bit lines PBLn (for example, 10 parity bit line) are arranged so as to intersect with the word lines WLi of the plurality. In each I/O memory block IOMB1–IOMB8, a plurality of memory cells MC is further provided which are placed at intersections of the word lines WLi and the bit lines BLm and PBLn.

The word lines WLi are connected to a row decoder circuit 12 arranged on the left side of the array 10. The row decoder circuit 12 selects one of the word lines WLi in accordance with externally provided row address signals RA0–RAi. The row decoder circuit 12 drives the selected word line with a word line voltage that is set according to the desired mode of operation (for example, read and write modes of operation). The operation of the row decoder circuit 12 is described in the '717 patent. The 512 bit lines BLm and 10 parity bit lines PBLn in each I/O memory block IOMB1–IOMB8 are coupled to a sense amplifier circuit 14 placed on the bottom end of the array 10. Although not shown in the drawing, latch-type sense amplifiers, currently used in NAND type flash memory and DRAM devices, are provided in the sense amplifier circuit 14 so as to correspond to the number of the bit lines and parity bit lines in each I/O memory block. For example, the number of sense amplifiers corresponding to each of the I/O memory blocks IOMB1–IOMB8 is 522 (512+10). An example of the latch-type sense amplifier used in NAND flash memory devices is disclosed in U.S. Pat. No. 5,216,633, entitled "NON-VOLATILE SEMICONDUCTOR MEMORY DEVICE INCLUDING ACCESS CODE CIRCUITRY", which is hereby incorporated by reference.

The respective sense amplifiers corresponding to each block IOMB1–IOMB8 sense and amplify 512 data bits and 10 check bits from the corresponding I/O memory block through the corresponding bit lines BLm and parity bit lines PBLn, and then latch the sensed data and check bits therein.

A column pass gate circuit 16 is connected to the sense amplifier circuit 14. The column pass gate circuit 16 operates under the control of a column decoder circuit 18. Error correction circuits 20 respectively corresponding to the I/O memory blocks IOIMB1–IOMB8 are connected to the column pass gate circuit 16. The 512 data bits and 10 check bits read out from each of the I/O memory blocks IOMB1–IOMB8, that is, latched in the sense amplifier circuit 18, are sequentially transferred to the corresponding error correction circuit 20 through the column pass gate circuit 16 responsive to column decoder circuit 18. The operation of these circuits will be more fully described later.

FIG. 2 is a block diagram of the error correction circuit 20 illustrated in FIG. 1. The error correction circuit 20 illustrated in FIG. 2 corresponds to one of the 8 I/0 memory blocks IOMB1–IOMB8 and comprises a syndrome generator 22, an error detector 24, and an error corrector 30. It should be obvious to one skilled in the art that all error correction circuits 20 shown in FIG. 1 are configured as shown in FIG. 2. In FIG. 2, the error correction circuit 20 is based on the Hamming code ($2^r \geq m+r+1$, wherein m is the number of data bits and r is the number of check bits or redundant bits generated by the generator polynomial $g(x) = x^{10}+x^3+1$).

FIG. 3 is a timing diagram of the error correction circuit illustrated in FIG. 2. Operation of reading out data from the memory cell array 10 will be described more fully below with reference to FIGS. 1 to 3. For simplicity, the data read operation of only one I/O memory block will be described.

The operation of reading out data is divided into a first and a second cycle. During the first cycle, 522 bits of an ECC word, which corresponds to a selected page (or a word line) of the I/O memory block, for example, IOMB1, are sequentially transferred to the syndrome generator 22 through the switch circuit 26 (that is, the column pass gate circuit 16). The syndrome generator 22 produces 10 syndrome bits responsive to the 522 bits of the ECC word. The 10 syndrome bits thus produced from the syndrome generator 22 are used as an address for correcting a 1-bit error in the data bits of the selected page and are decoded by means of the error detector 24. In FIG. 2, the column pass gate circuit 16 of FIG. 1 is illustrated by the switch circuits 26 and 28 that operate exclusively of each other during the first and second cycles.

During the second cycle, the signal (address information for the error) decoded by the detector 24 and the 512 data bits latched in the sense amplifier circuit 14 are sequentially applied to the error corrector 30, which is embodied by an exclusive-OR gate circuit. The 512 data bits thus corrected are provided externally through a corresponding I/O circuit 32. For example, in the event that the signal from the detector 24 corresponding to a data bit currently transferred to the corrector 30 is at a logic 1, it means that the data bit is erroneous. Thus, the erroneous data bit is transferred to the corresponding I/O circuit 32 after being corrected by the corrector 30. If the signal from the detector 24 is at a logic 0, it means that the data bit is not erroneous. Thus, the data bit is transferred to the corresponding I/O circuit 32 without any error correction ocurring at the corrector 30.

According to the conventional semiconductor memory device with the above described error correction circuit scheme, only a bit error in the 512 data bits of a selected page can be detected and corrected. Further, 522 clock cycles for controlling the switch circuit 26 (FIG. 2) are required during the first cycle of the read mode of operation in which an error place in the 512 data bits is detected as above described. This causes an increase in the access time of the flash memory device. Therefore, to realize a high-speed memory device having a high reliability requires reducing the access time and improving the error correction efficiency.

SUMMARY OF THE INVENTION

It is therefore an object of the present invention to provide a semiconductor memory device with an on-chip error correction circuit capable of improving the access time.

It is another object of the invention to provide a semiconductor memory device with an on-chip error correction circuit capable of correcting at least two erroneous bits in the data bits that correspond to an input/output memory block.

It is still another object of the invention to provide a method for correcting a data error in a semiconductor memory device.

According to one aspect of the present invention, there is provided a method for correcting an error in a semiconductor memory device having a memory cell array including a plurality of data bits and plurality of check bits corresponding to the plurality of data bits. The plurality of data bits and the plurality of check bits are divided into at least a first and a second group. The method comprises sensing the plurality of data bits and the plurality of check bits from the memory cell array; simultaneously receiving the data and check bits of the first group and the data and check bits of the second group to generate a first and a second set of syndrome bits corresponding to the first and the second group of the data and check bits, respectively; decoding the first and the second set of syndrome bits to detect an error in the data bits of the first and the second group, respectively, and generating a first signal indicative of the presence or absence of the error in the data bits of the first group and a second signal indicative of the presence or absence of the error in the data bits of the second group; and alternatively receiving the data bits of the first and second group and correcting the error in the data bits of the first group responsive to the first signal and the error in the data bits of the second group in response to the second signal.

According to another aspect of this invention, there is provided a semiconductor memory device comprising a memory cell array for storing a plurality of data bits and a plurality of check bits corresponding to the plurality of data bits, the plurality of data bits and the plurality of check bits being divided into at least first and second groups; means for reading out the plurality of data bits and the plurality of check bits from the memory cell array; and means for correcting a first error in the data bits of the first group and a second error in the data bits of the second group, respectively. The means for correcting receives the data and check bits of the first group and the data and check bits of the second group in parallel, generates first and second syndrome bits respectively corresponding to the first and the second group of the data bits, and corrects the first error in the data bits of the first group and the second error in the data bits of the second group responsive to the first and the second syndrome bits, respectively. An input/output circuit is further provided that outputs the data bits of the first and the second group alternatively outputted from the means for correcting. The means for correcting comprises a first error correction circuit for correcting the first error in the data bits of the first group and a second error correction circuit for correcting the second error in the data bits of the second group, the first and second error correction circuits being commonly coupled to the input/output circuit, wherein the first error correction circuit comprises a first syndrome generator for sequentially receiving the plurality of data and check bits of the first group and generating the first syndrome bits responsive thereto; a first detector for decoding the first syndrome bits to detect the first error in the data bits of the first group and generating a first signal indicative of the presence or absence of the first error; and a first corrector for sequentially receiving the data bits of the first group and correcting the first error in the data bits of the first group responsive to the first signal indicative of the presence or absence of the first error; and wherein the second error correction circuit comprises a second syndrome generator for sequentially receiving the plurality of data and check bits of the second group and generating the second syndrome bits responsive thereto; a second detector for decoding the second syndrome bits to detect the second error in the data bits of the second group and generating a second signal indicative of the presence or absence of the second error; and a second corrector for receiving the data bits of the second group, and correcting the second error in the data bits of the second group responsive to the second signal indicative of the presence or absence of the second error.

BRIEF DESCRIPTION OF THE DRAWINGS

The foregoing and other objects, features, and advantages of present invention will become more readily apparent from the following detailed description of a preferred embodiment that proceeds with reference to the following drawings.

DESCRIPTION OF THE PREFERRED EMBODIMENT

Preferred embodiments according to the present invention will be more fully described below with reference to the accompanying drawings.

Figure 1:
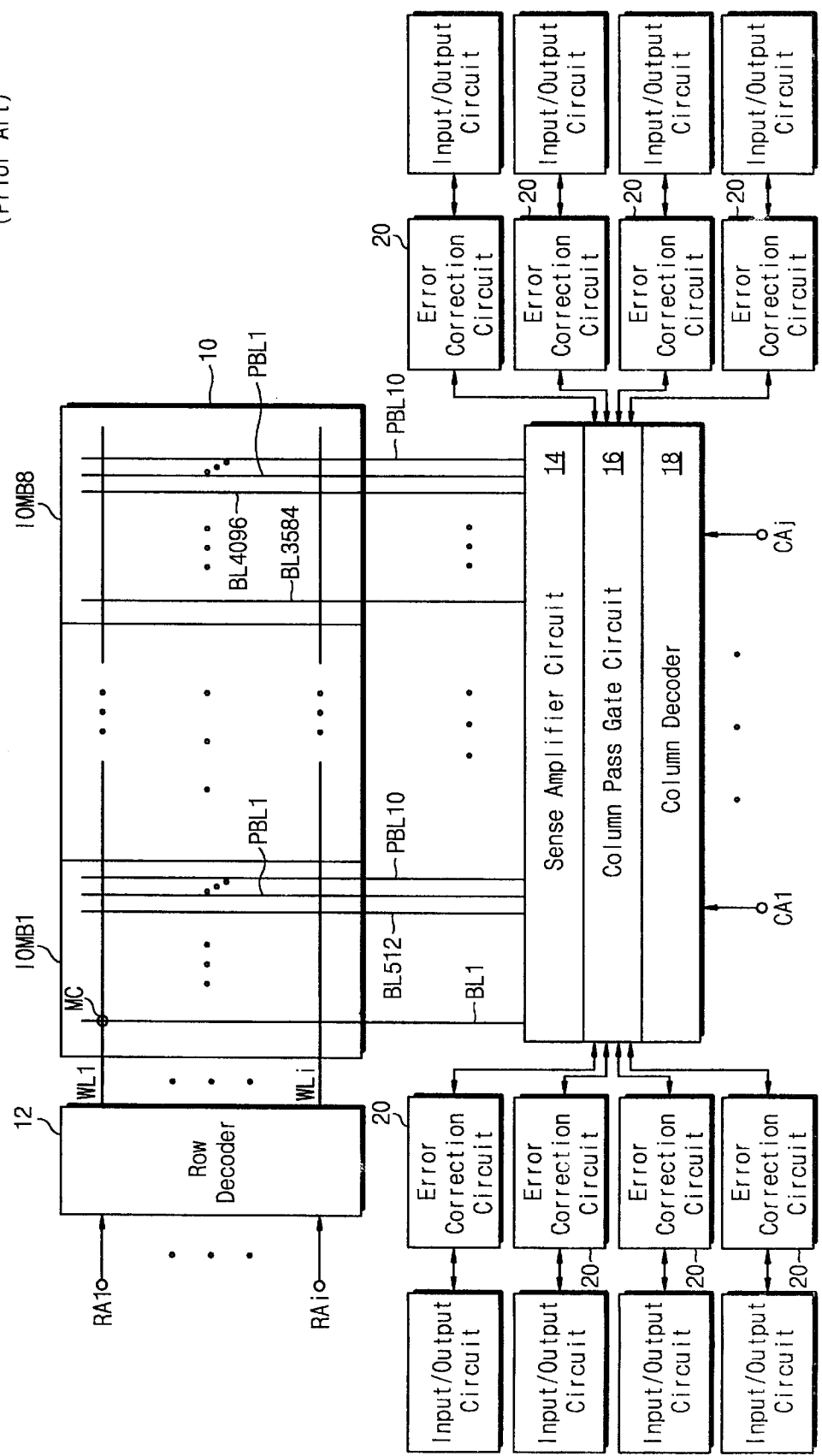
FIG. 1 is a block diagram of a conventional semiconductor memory device having a conventional on-chip error correction circuit.
Figure 2:
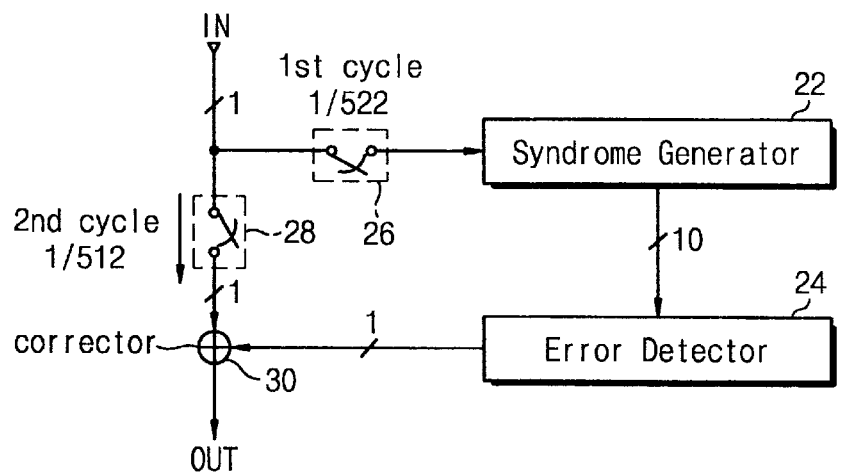
FIG. 2 is a block diagram of the conventional error correction circuit shown in FIG. 1.
Figure 3:
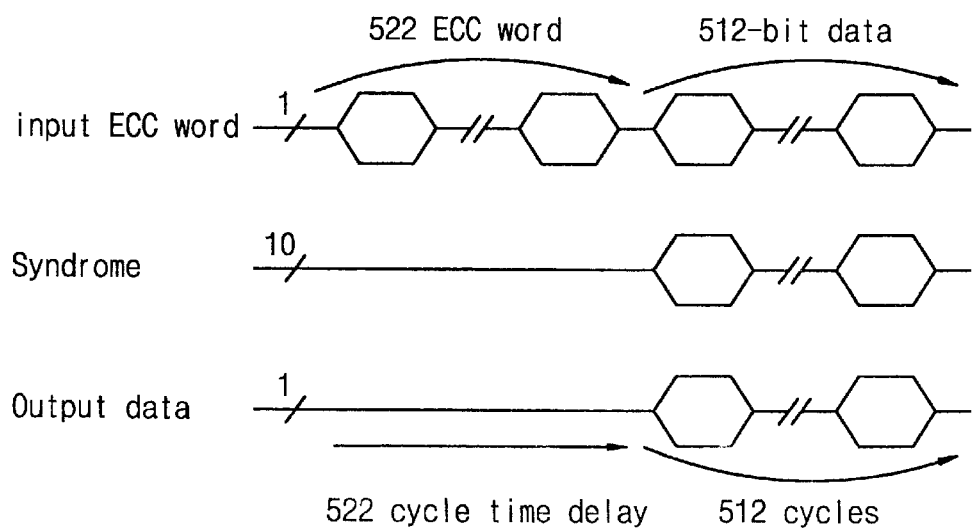
FIG. 3 is a timing diagram of the error correction circuit shown in FIG. 2.
Figure 4:
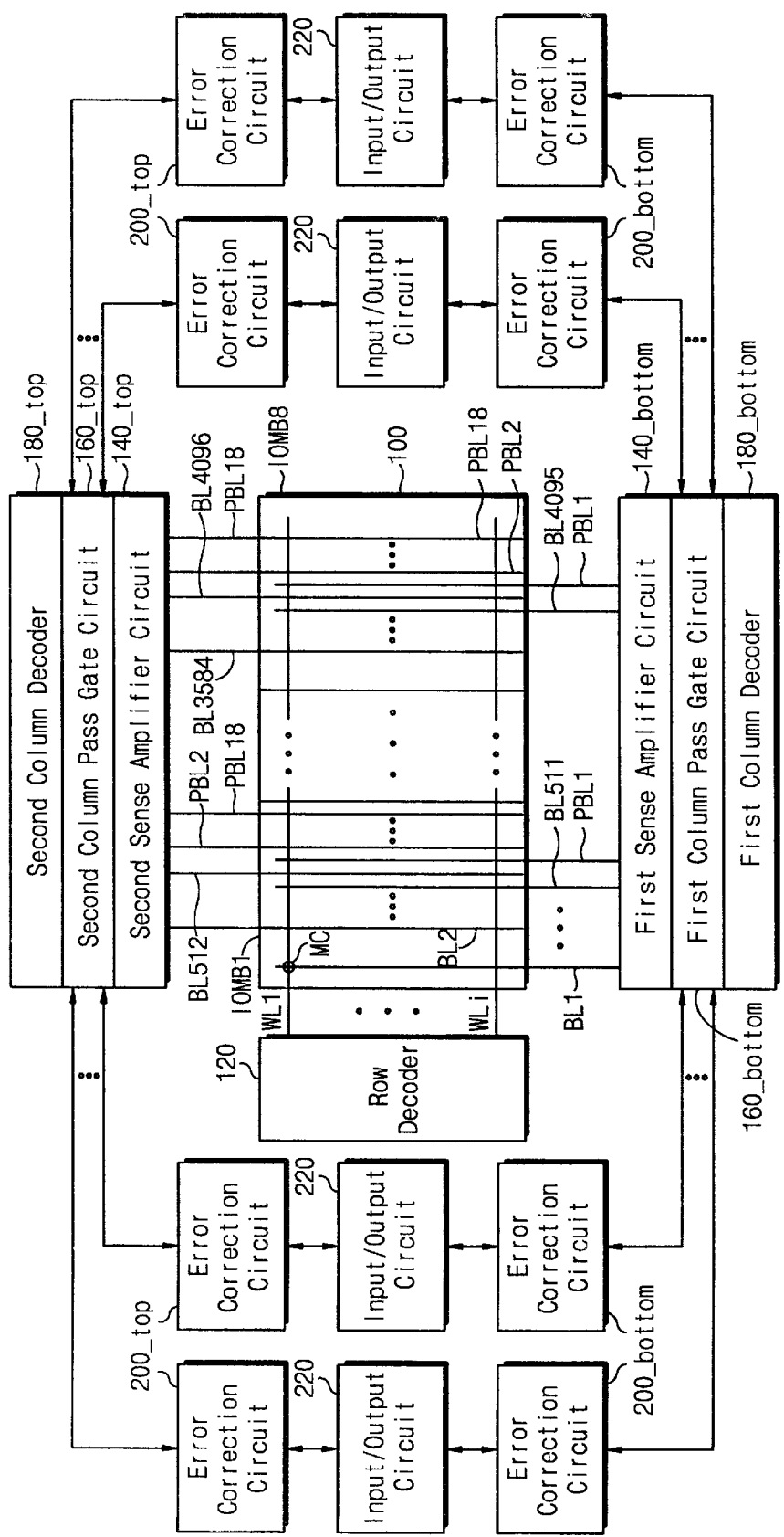
FIG. 4 is a block diagram of a preferred embodiment of the semiconductor memory device according to the present invention.

FIG. 4 is a block diagram of a preferred embodiment of a semiconductor memory device according to the present invention. This embodiment will be described under the assumption that the input/output data width is X8 and that eight input/output circuits for inputting/outputting data to/from the semiconductor memory device are provided. The semiconductor memory device of this embodiment comprises a memory cell array 100, divided into eight I/O memory blocks IOMB1–IOMB8 so as to correspond to the eight input/output circuits 220, respectively.

As illustrated in FIG. 4, 512 bit lines BL and 18 parity bit lines PBL are provided in each of the eight I/O memory blocks IOMB1–IOMB8. A plurality of word lines WLi are arranged respectively in a row direction through the I/O memory blocks IOMB1–IOMB8 and coupled to a row decoder circuit 120. A plurality of memory cells MC are placed at intersections of the word lines WLi and the bit lines BLm and PBLn in each I/O memory block. Data bits are respectively stored in memory cells which are connected to the 512 bit lines BLm provided in the respective I/O memory blocks IOMB1–IOMB8. Check bits are respectively stored in memory cells connected to the 10 parity bit lines PBLn provided in the respective I/O memory blocks IOMB1–IOMB8.

For simplicity, the elements comprising a single I/O memory block (for example, IOMB1) are described. However, it should be obvious to one skilled in the art that the elements associated with remaining blocks IOMB2–IOMB8 are configured identically with those associated with the exemplary block IOMB1.

Referring to FIG. 4, a first sense amplifier circuit 140_bottom is arranged at a bottom end of the memory cell array 100. A first group of bit lines and parity bit lines, for example, odd-numbered bit lines BL1, BL3, . . . , BL511 and odd-numbered parity bit lines PBL1, PBL3, . . . , PBL17 of the 512 bit lines BL1–BL512 and 18 parity bit lines PBL1–PBL18 are connected to the first sense amplifier circuit 140_bottom. In the first sense amplifier circuit 140_bottom, although not shown in FIG. 4, such latch-type sense amplifiers—as disclosed in the above mentioned patent '717—will be provided so as to correspond to the 256 bit lines BL1, BL3, . . . , BL511 and 9 parity bit lines PBL1, PBL3, . . . , PBL17, respectively. A second sense amplifier circuit 140_top is arranged at the top end of the memory cell array 100, to which a second group of bit lines and parity bit lines, for example, even-numbered bit lines BL2, BL4, . . . , BL512 and even-numbered parity bit lines PBL2, PBL4, . . . , PBL12 of the 512 bit lines BL1–BL512 and 18 parity bit lines PBL1–PBL18 are connected. In the second sense amplifier circuit 140_bottom, a plurality of latch-type sense amplifiers are provided so as to correspond to the 256 bit lines BL2, BL4, . . . , BL512 and 9 parity bit lines PBL2, PBL4, . . . , PBL18, respectively.

According to the above described sense amplifier arrangement, 256 data bits in memory cells, which are respectively arranged at intersections of a selected word line (or a page) WLi and odd-numbered bit lines BL1, BL3, . . . , BL511 and 9 check bits in memory cells, which are respectively arranged at intersections of the selected word line WLi and odd-numbered parity bit lines PBL1, PBL3, . . . , PBL17, are sensed and latched in the first sense amplifier circuit 140_bottom. Similarly, 256 data bits in memory cells, each of which is arranged at intersections of the selected word line WLi and even-numbered bit lines BL2, BL4, . . . , BL512, and 9 check bits in memory cells, each of which is arranged at intersections of the selected word line WLi and even-numbered parity bit lines PBL2, PBL4, . . . , PBL18, are sensed and latched in the second sense amplifier circuit 140_top.

A first column pass gate circuit 160_bottom and a first column decoder circuit 180_bottom are arranged at the bottom end of the memory cell array 100 so as to correspond to the first sense amplifier circuit 140_bottom. Eight error correction circuits 200_bottom are coupled to the first column pass gate circuit 160_bottom, each error correction circuits 200_bottom detects and corrects an error in 256 data bits (odd-numbered data bits) read out from corresponding I/O memory block through the odd-numbered bit lines. Similarly, a second column pass gate circuit 160_top and a second column decoder circuit 180_top are arranged at the top end of the memory cell array 100 so as to correspond to the second sense amplifier circuit 140_top. Eight error correction circuits 200_top are coupled to the second column pass gate circuit 160_top, each error correction circuit 200_top detects and corrects an error in 256 data bits (even-numbered data bits) read out from corresponding I/O memory block through even-numbered bit lines. As a result, two error correction circuits 200_bottom and 200_top are provided so as to correspond to one I/O memory block. The error correction circuits 200_bottom and 200_top are commonly connected to a corresponding I/O circuit 220 as illustrated in FIG. 4.

The first column pass gate circuit 160_bottom sequentially transfers the odd-numbered data and check bits to the error correction circuit 200_bottom during a first cycle of a read mode of operation. The second column pass gate circuit 160_top sequentially transfers the even-numbered data and check bits to the error correction circuit 200_top during the first cycle of the read mode of operation.

For example, two data bits associated with an odd-numbered bit line BL1 and an even-numbered bit line BL2 are simultaneously transferred to corresponding error correction circuits 200_bottom and 200_top through the first and the second column pass gate circuit 160_bottom and 160_top. Remaining data bits and check bits are transferred to the corresponding error correction circuits 200_bottom and 200_top in the same manner as above described. The error correction circuit 200_bottom responds to the 256 odd-numbered data bits and 9 odd-numbered check bits to detect an 1-bit error place in the 256 odd-numbered data bits during the first cycle. Similarly, the error correction circuit 200_top responds to the 256 even-numbered data bits and 9 even-numbered check bits to detect an 1-bit error place in the 256 even-numbered data bits during the first cycle.

It can be seen that only 265 clock cycles are used during the first cycle because 265 odd-numbered data and check bits and 265 even-numbered data and check bits are transferred to the corresponding error correction circuits 200_bottom and 200_top in parallel and in sequence. This means that the time required for detecting an error place in data bits is shortened by nearly half compared with that of the conventional semiconductor memory device. As a result, it is possible to reduce the access time of the flash memory device with the on-chip ECC according to the present invention.

During the second cycle of the read mode of operation, the respective error correction circuits 200_bottom and 200_top alternatively receive 256 odd-numbered data bits and 256 even-numbered data bits to correct an 1-bit error of the odd-numbered data bits and an 1-bit error of the even-numbered data bits using the information of the error place detected during the first cycle, respectively. Similarly to the above described conventional device, 512 clock cycles are used during the second cycle. However, it can be seen from the above description that there are detected and corrected at least two erroneous data bits in the 512 data bits read out from one I/O memory block. Thus, the semiconductor memory device has an improved error correction efficiency.

Plural bit lines and plural parity bit lines arranged in each I/O memory block can be divided equally into 2N groups (N=1, 2, . . . , j), and then 2N error correction circuits can be implemented so as to correspond to one I/O circuit in the same manner as above described. Therefore, it should be obvious to a person of ordinary skill in the art that 2N erroneous data bits in the data bits read from each I/O memory block are detected and corrected.

Figure 5:
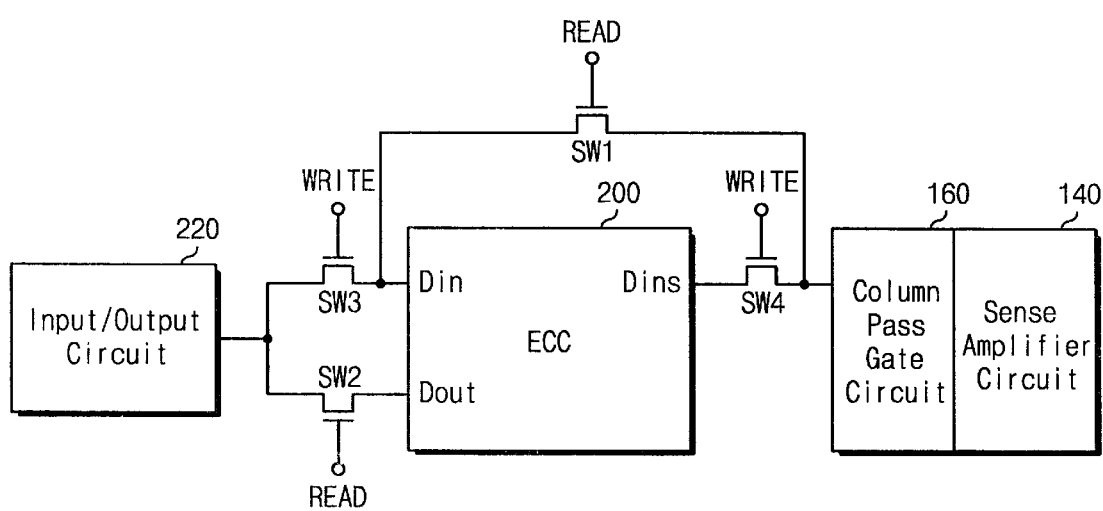
FIG. 5 is a block diagram of the data input and output according to read and write modes of operation.

Referring to FIG. 5, when a signal READ is at a logic high level and a signal WRITE is at a logic low level, that is, during a read mode of operation, data bits latched in a sense amplifier circuit 140 are sequentially applied to an input terminal Din of the error correction circuit 200 through the column pass gate circuit 160 and the switch SW1. The corrected data bits in the ECC 200 are sequentially transferred to an input/output circuit 220 through a switch SW2. On the other hand, when the signal READ is at a logic low level and the signal WRITE is at a logic high level, that is, during the write mode of operation, data bits provided through the input/output circuit 220 from the exterior are sequentially applied to the data input terminal Din of the error correction circuit 200 via a switch SW3. The error correction circuit 200 generates plural syndrome bits, which are transferred in the sense amplifier circuit 140 through a switch SW4 and the column pass gate circuit 160.

The error correction circuit 200_bottom of FIG. 4 coupled to the first column pass gate circuit 160_bottom generates the odd-numbered check bits during a write mode of operation. Similarly, the error correction circuit 200_top of FIG. 4 coupled to the second column pass gate circuit 160_top generates the even-numbered check bits during the write mode of operation. The associated operation described above is detailed below.

Figure 6:
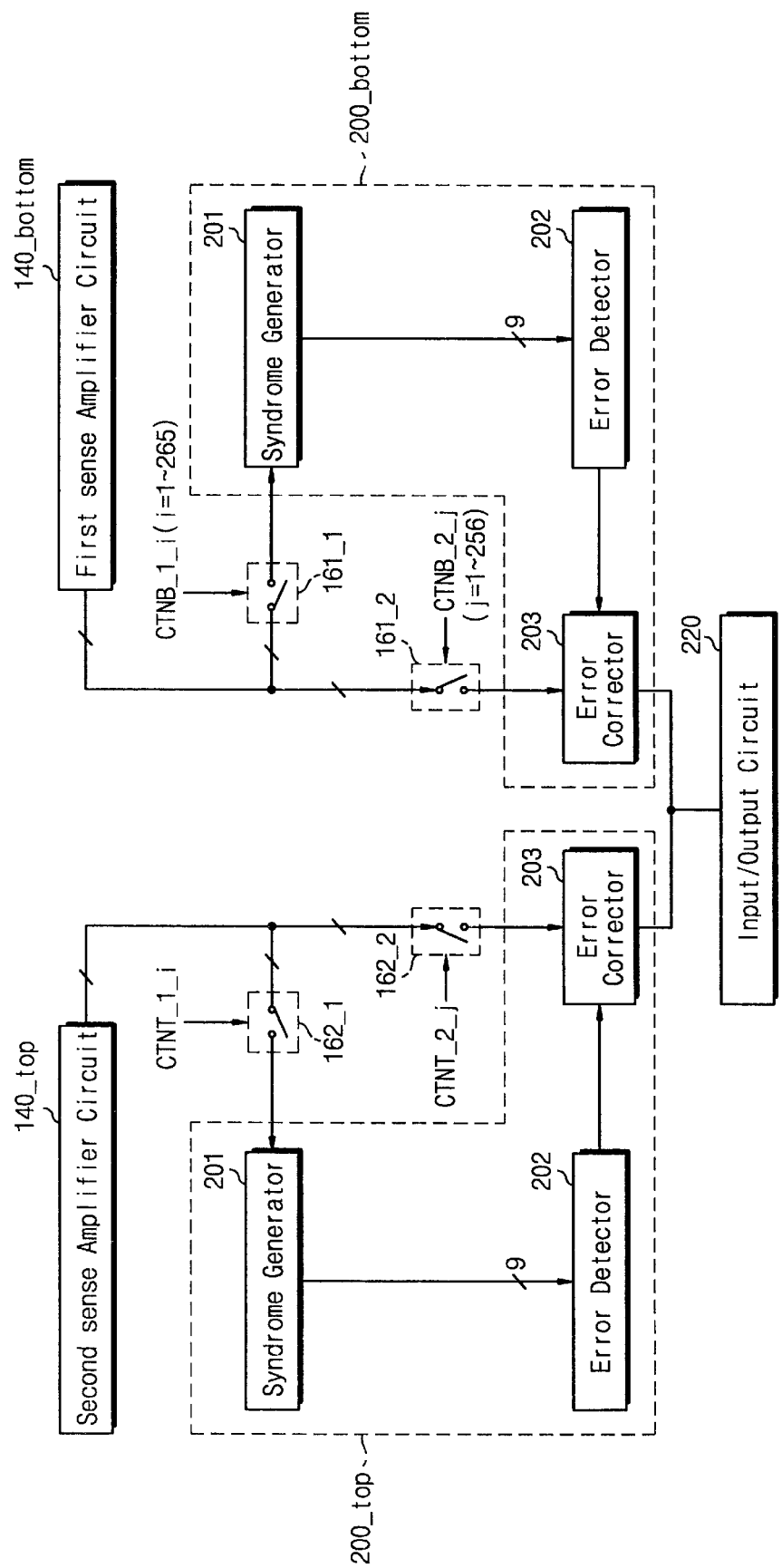
FIG. 6 is a block diagram of two error correction circuits, first and second sense amplifier circuits, and first and second column pass gate circuits associated with one input/output circuit.

FIG. 6 is a block diagram showing two error correction circuits, first and second sense amplifier circuits, and first and second column pass gate circuits associated with one I/O circuit. For simplicity, the first column pass gate circuit 160_bottom is symbolized by switch circuits 161_1 and 161_2 that perform their switch operations according to corresponding control signals CTNB_1_i (i=1–256) and CTNB_2_j (j=1–256), respectively. Similarly, the second column pass ate circuit 160_top is symbolized by switch circuits 162_1 and 162_2 that perform their switch operations according to corresponding control signals CTNT_1_i and CTNT_2_j, respectively. The symbols _1 and _2 indicate the first cycle and the second cycle, respectively.

As illustrated in FIG. 6, the error correction circuit 200_bottom is coupled to the first sense amplifier circuit 140_bottom through the switch circuit 161_1 (that is, the first column pass gate circuit 160_bottom) and comprises a syndrome generator 201, an error detector 202, and an error corrector 203. The syndrome generator 201 sequentially receives 256 odd-numbered data bits and 9 odd-numbered check bits during a first cycle of the read mode of operation, and then generates 9 syndrome bits. The error detector 202 receives the 9 syndrome bits from the syndrome generator 201 and outputs a signal indicative of the presence of an error. The error corrector 203 sequentially receives the 256 data bits from the first sense amplifier circuit 140_bottom through the switch circuit 161_2 (that is, the first column pass gate circuit 160_bottom) during a second cycle of the read mode of operation and then corrects an error in the 256 data bits responsive to the signal from the error detector 202. Thus, 256 corrected data bits are sequentially transferred to the corresponding I/O circuit 220.

The error correction circuit 200_top of FIG. 6 is coupled to the second sense amplifier circuit 140_top through the switch circuit 162_1 (that is, the second column pass gate circuit 160_top). The error correction circuit 200_top comprises a syndrome generator 201, an error detector 202 and an error corrector 203, which perform the same function as those of the error correction circuit 200_bottom (their description is thus omitted).

Figure 7:
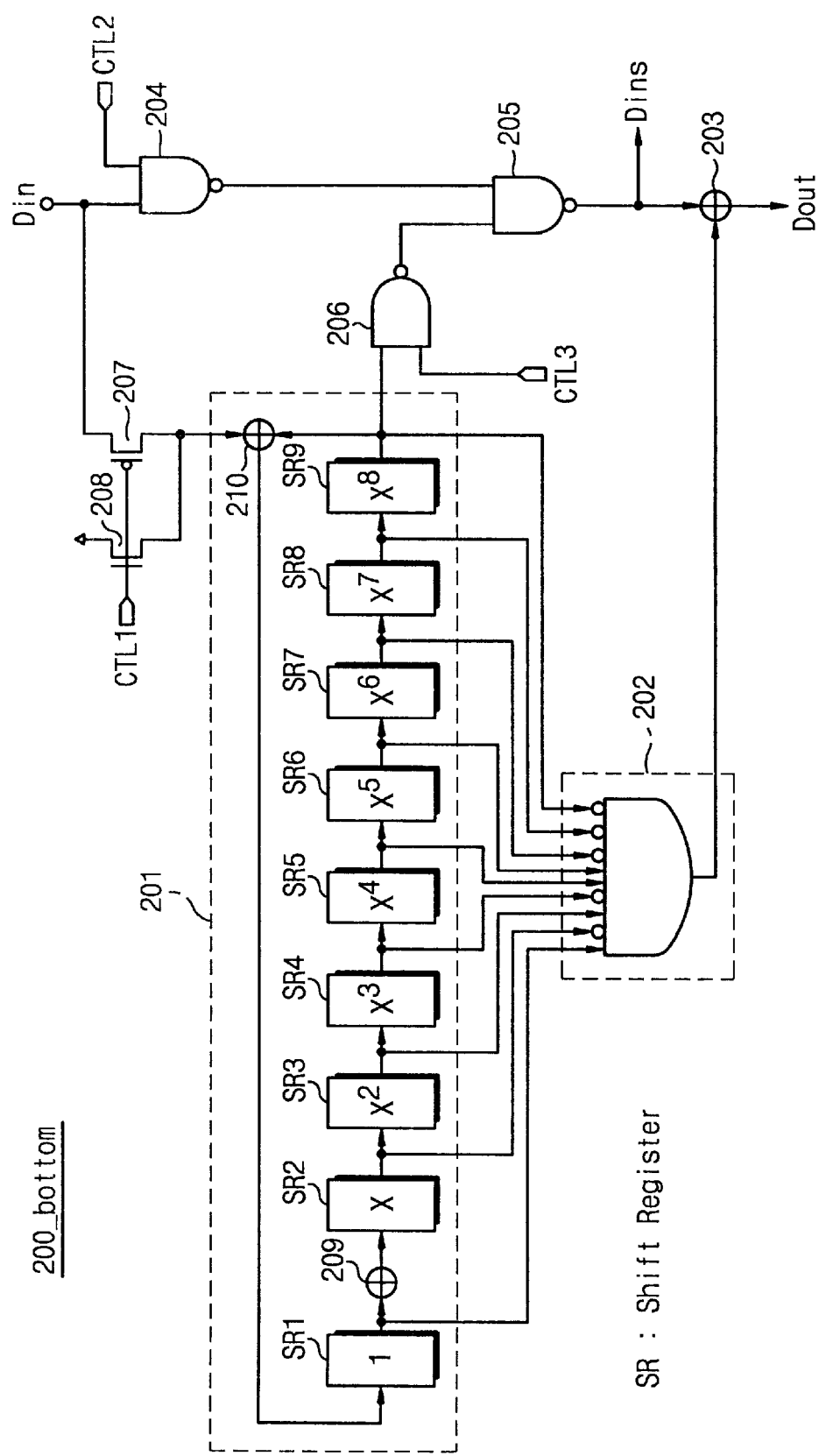
FIG. 7 is a block diagram of a preferred embodiment of the error correction circuit shown in FIG. 4 according to the present invention.
Figure 8:
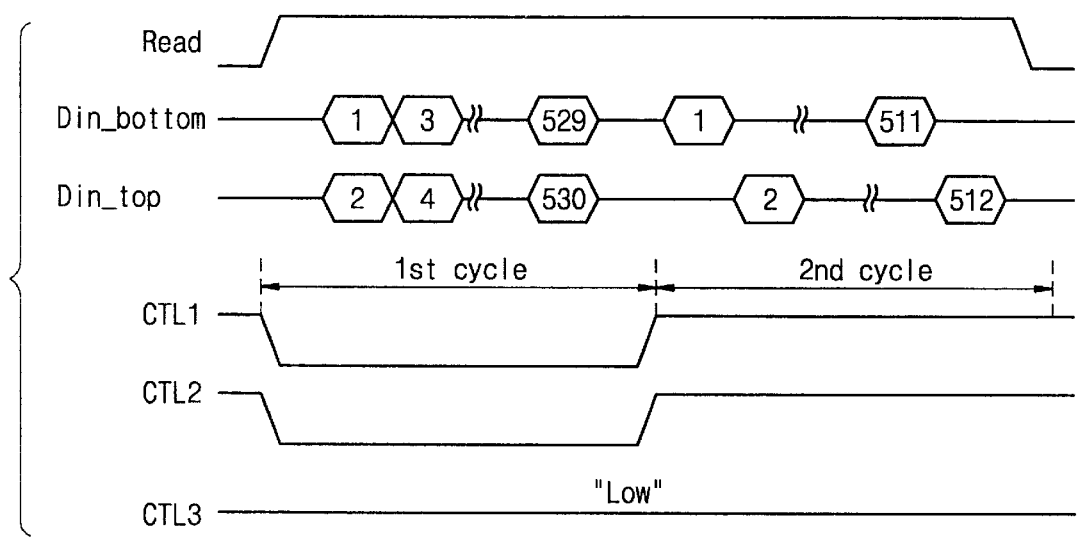
FIG. 8 is a timing diagram of the control signals used in the error correction circuit shown in FIG. 7.

FIG. 7 is a preferred embodiment of an error correction circuit illustrated in FIG. 4 according to the present invention. FIG. 8 is a timing diagram of the control signals used in FIG. 7. Referring to FIG. 7, the error correction circuit 200_bottom is based on the Hamming code $(2^r \geq m+r+1)$ generated by the generator polynomial $g(x)=x^9+x+1$. The error correction circuit 200_bottom comprises nine shift registers SR1–SR9 and two exclusive-OR gates 209 and 210 connected as illustrated in FIG. 7. The syndrome generator 201 comprises exclusive OR gates 209 and 210. In the circuit 200_bottom, 9-input logic circuit 202 is further provided that decodes nine syndrome bits from the syndrome generator 201 and serves as an error detector. The error correction circuit 200_bottom further comprises an exclusive-OR gate 203 used as an error corrector, three NAND gates 204, 205 and 206, and PMOS and NMOS transistors 207 and 208, respectively, connected as shown in FIG. 7.

Although ithe error correction circuits 200_bottom and 200_top corresponding to the first sense amplifier circuit 140_bottom is illustrated in FIG. 7, it should be obvious to a person skilled in the art that the error correction circuit 200_top corresponding to the second sense amplifier circuit 140_top is configured identically to that 200_bottom.

The error correction circuit 200_bottom operates as follows. As set forth above, the operation of reading out data bits is divided into a first cycle and a second cycle. Assume that 256 odd-numbered data bits and 9 odd-numbered check bits from, for example, the I/O memory block IOMB1 are latched in the first sense amplifier circuit 140_bottom and 256 even-numbered data bits and 9 even-numbered check bits from the I/O memory block IOMB1 are latched in the second sense amplifier circuit 140_top.

During the first cycle, as illustrated in FIG. 8, signals CTL1, CTL2 and CTL3 remain low, so that the PMOS transistor 207 is turned on and outputs of the NAND gates 204 and 205 remain high. Under this condition, odd-numbered data and check bits latched in the first sense amplifier circuit 140_bottom are sequentially transferred to the syndrome generator 201 of the error correction circuit 200_bottom via data input terminal Din and the PMOS transistor 207. At the same time, even-numbered data and check bits latched in the second sense amplifier circuit 140_top are sequentially transferred to the syndrome generator 201 of the error correction circuit 200_top via input terminal Din and the PMOS transistor 207. Odd-numbered and even-numbered data and check bits sequentially transferred to the syndrome generators 201 are cycled through the shift registers SR1–SR9. As a result of the above described cyclic operation, a first and a second set of syndrome bits are generated from the corresponding syndrome generators 201 each corresponding to the error correction circuits 200_bottom and 200_top. The first and second sets of syndrome bits respectively stored in the corresponding syndrome generators 201 are used as an address for indicating an error place of the odd-numbered data bits and an error place of the even-numbered data bits, respectively.

During the second cycle, the signals CTL1 and CTL2 transition from a logic low level to a logic high level, and the signal CTL3 remains at a logic low level. This logic forces the PMOS transistor 207 to be turned off and the NMOS transistor 208 to be turned on. That is, the input terminal Din is separated from the syndrome generator 201. Instead, data bits applied to the data input terminal Din are transferred to the error corrector 203 via the NAND gates 204 and 205.

The odd-numbered and even-numbered data bits in the first and the second sense amplifier 140_bottom and 140_top are alternatively transferred by the NAND gates 205 and 206 of the respective circuit 200_bottom and 200_top to the corresponding error correctors 203 via the corresponding column pass gate circuits 160_bottom and 160_top. For example, an odd-numbered data bit is transferred to the error corrector 203 of the error correction circuit 200_bottom and then an even-numbered data bit is transferred to the error corrector 203 of the error correction circuit 200_top.

At this same time, the syndrome bits of the first set corresponding to the odd-numbered data bits are cycled or right-shifted in the syndrome generator 201 of the error correction circuit 200_bottom whenever one data bit is transferred to the error corrector 203 of the error correction circuit 200_bottom. The syndrome bits thus cycled are decoded by the error detector 202 of the error correction circuit 200_bottom. A signal indicative of the error present or absence of a present transferred data bit is also applied to the error corrector 203 of the error correction circuit 200_bottom. The above described operation is similarly performed in the error correction circuit 200_top.

As a result, when an odd-numbered data bit is applied to the error corrector 203 of the error correction circuit 200_bottom, the applied data bit is outputted either after the error correction or without the error correction in accordance with a logic state of the signal from the error detector 202 of the error correction circuit 200_bottom. For example, when the signal from the. error detector 202 is at a logic high level, it means that the odd-numbered data bit applied to the error corrector 203 is erroneous. Thus, the data bit is outputted to the I/O circuit 220 after the error correction. When the signal from the error detector 202 is at a logic low level, it means that the odd-numbered data bit applied to the error corrector 203 is not erroneous. Thus, the data bit is outputted to the I/O circuit 220 without the error correction.

As set forth above, the error correction circuits 200_bottom and 200_top are used as circuits for generating odd-numbered and even-numbered check bits, respectively. In particular, during a write mode of operation, the control signals CTL1 and CTL3 turn to a logic low level, and the signal CTL2 turns to a logic high level. Under this condition, 256 odd-numbered data bits of 512 data bits to be written to the IPO memory block IOMB1 are sequentially applied to the data input terminal Din of the error correction circuit 200_bottom. The 256 odd-numbered data bits thus applied are sequentially transferred to the first sense amplifier circuit 140_bottom via both the NAND gates 204 and 205 and the first column pass gate circuit 160_bottom. At the same time, the 256 odd-numbered data bits are sequentially transferred and cycled to the syndrome generator 201 via the PMOS transistor 207. This operation is ended when all of the 256 odd-numbered data bits are applied to the syndrome generator 201. As a result, nine check bits corresponding to the 256 data bits are generated by the syndrome generator 201, and then are sequentially transferred to the first sense amplifier circuit 140_bottom via the NAND gates 206 and 205 with the signals CTL1 and CTL3 high and the signal CTL2 low. Nine check bits corresponding to 256 even-numbered data bits are generated in the same manner as above described and are sequentially transferred to the second sense amplifier circuit 140_top. After these operations, the odd-numbered and even-numbered data and check bits are programmed by using well-known program process.

Figure 9:
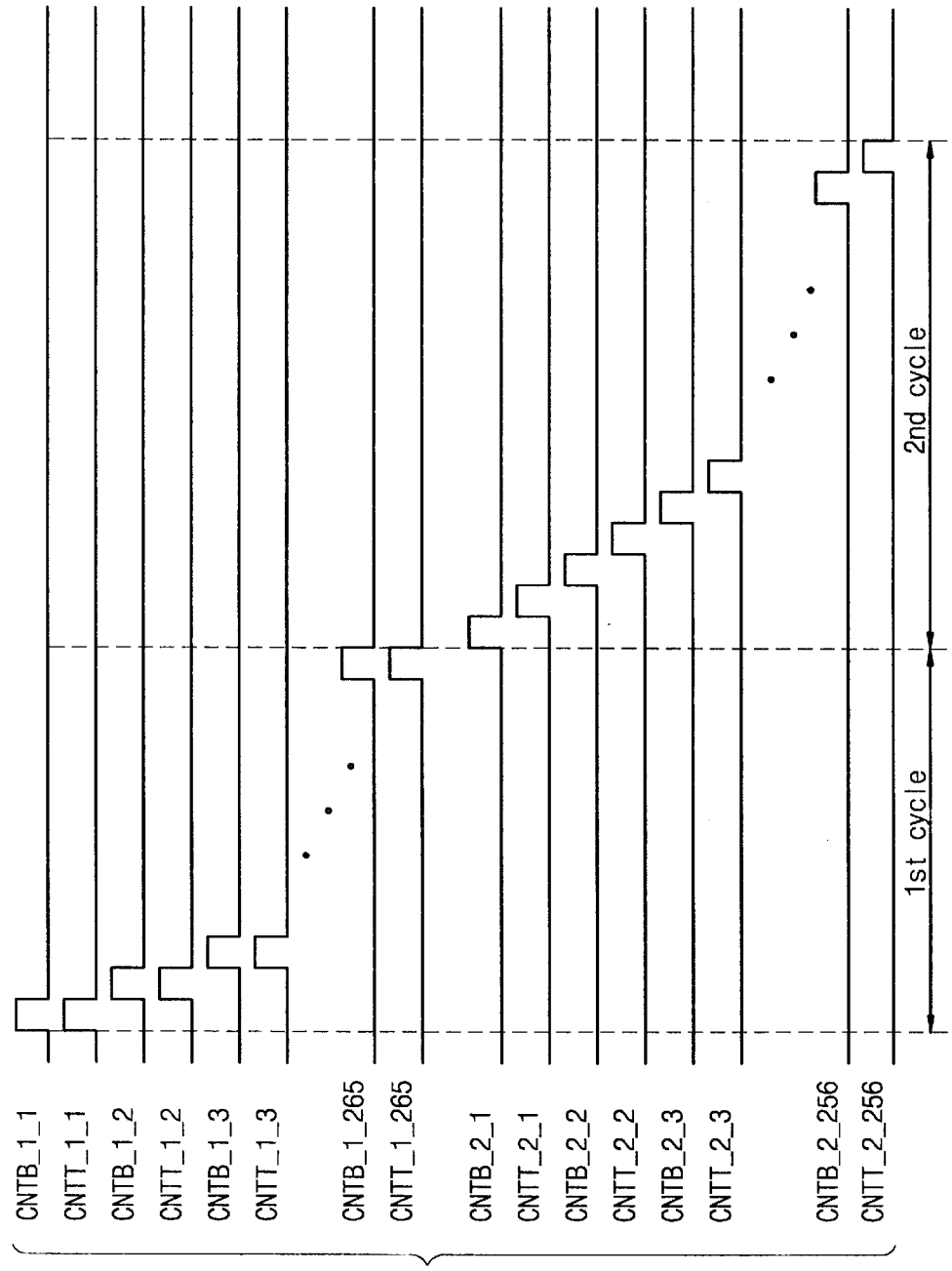
FIG. 9 is a timing diagram of the control signals used in the circuit shown in FIG. 6.

FIG. 9 is a timing diagram of the switch control signals used in FIG. 6. For simplicity, the error correcting operation associated with the error correction circuits 200_bottom and 200_top corresponding to only one input/output circuit 220 will be described below. Other input/output circuits 220 operate similarly.

During the first cycle, 256 odd-numbered data bits and 9 odd-numbered check bits are latched in the first sense amplifier circuit 140_bottom, and 256 even-numbered data bits and 9 even-numbered check bits are latched in the second sense amplifier 140_top. As control signals CTNB_1_1 and CTNT_1_1 are simultaneously pulsed, an odd-numbered data bit in the first sense amplifier circuit 140_bottom and an even-numbered data bit in the second sense amplifier circuit 140_top are simultaneously applied to the syndrome generators 201 of the corresponding error correction circuits 200_bottom and 200_top. Remaining odd-numbered and even-numbered data and check bits are simultaneously applied to the corresponding syndrome generators 201 via the switch circuits 161_1 and 162_1 as above described. A first set of nine syndrome bits corresponding to the odd-numbered data bits are generated in the syndrome generator 201 of the error correction circuit 200_bottom. A second set of nine syndrome bits corresponding to the even-numbered data bits are generated in the syndrome generator 201 of the error correction circuit 200_top. During the first cycle, the switch circuits 161_2 and 162_2 do not operate because all of the control signals CTNB_2_j and CTNT_2_j remain low as illustrated in FIG. 8.

The first set of syndrome bits are used as an address to detect the place of an error in the odd-numbered data bits during a second cycle. The second set of syndrome bits are used as an address to detect the place of the error in the even-numbered data bits during the second cycle.

It can be seen that the time required for the first cycle is 256 clock cycles while the conventional flash memory device requires 530 clock cycles. During the first cycle, the access time of the flash memory device with the on-chip ECC according to the present invention is reduced by half compared to the conventional flash memory device.

During the second cycle, an error of the odd-numbered data bits and an error of the even-numbered data bits are corrected by using the first and the second set of syndrome bits, respectively. In particular, when a control signal CTNB_2_1 transitions from a logic low level to a logic high level, an odd-numbered data bit is applied to the error corrector 203 of the circuit 200_bottom via the switch circuit 161_2. At the same time, a signal indicative of the presence or absence of an error is applied to the error corrector 203 from the error detector 202. The error detector 202 decodes the first set of nine syndrome bits from the syndrome generator 201 to output the signal indicative of the presence or absence of an error. The odd-numbered data bit currently applied to the error corrector is outputted into the corresponding I/O circuit 220 either after the error correction or without the error correction responsive to the logic state of the signal from the error detector 202.

As illustrated in FIG. 8, when a control signal CTNB_2_1 transitions from a logic high level to a logic low level and a control signal CTNT_2_1 transitions from a logic low level to a logic high level, an even-numbered data bit is applied to the error corrector 203 of the circuit 200_top via the switch circuit 162_2. At the same time, a signal indicative of the presence or absence of an error is applied to the error corrector 203 from the error detector 202, which decodes the second set of nine syndrome bits from the syndrome generator 201 to output the signal indicative of the presence or absence of an error. The even-numbered data bit currently applied to the error corrector 203 is outputted into the corresponding I/O circuit 220 either after the error correction or without the error correction responsive to the logic state of the signal from the error detector 202.

The first set of syndrome bits will be right-shifted in the corresponding syndrome generator 201 in order to generate a signal indicating whether the next odd-numbered data bit is erroneous. Similarly, the second set of syndrome bits will be right-shifted in the corresponding syndrome generator 201 in order to generate a signal indicating whether the next even-numbered data bit is erroneous. The above explained error correction operation will be performed repeatedly in association with remaining odd-numbered and even-numbered data bits.

With the error correction scheme according to the present invention, a 1-bit error in the odd-numbered data bits is corrected through the error correction circuit 200_bottom and, at the same time, a 1-bit error in the even-numbered data bits is corrected through the error correction circuit 200_top. Thus, 2-bit error in the 512 data bits read out from each I/O memory block is corrected.

Figure 10:
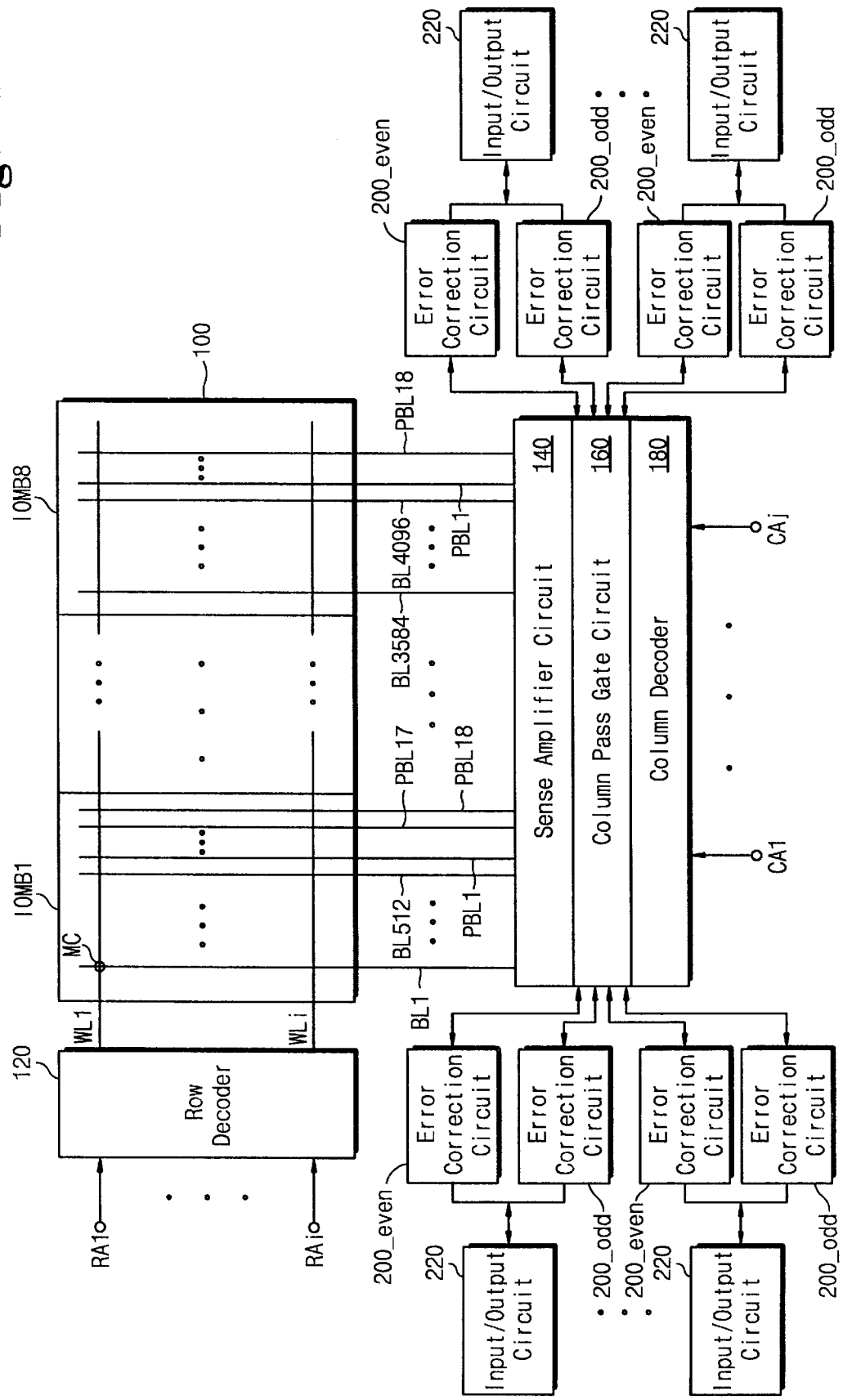
FIG. 10 is a block diagram of a second embodiment of the semiconductor memory device according to the present invention.

FIG. 10 is a second embodiment of the semiconductor memory device according to the present invention. In FIG. 10, the constituent elements that are identical to those of FIG. 4 are labeled with the same or like reference numerals. The second embodiment illustrated in FIG. 10 differs from the first embodiment of FIG. 4 only in that a sense amplifier circuit 140, a column pass gate circuit 160 and a column decoder circuit 180 are disposed at a bottom side. Similarly to the first embodiment, two error correction circuits 200_odd and 200_even are provided so as to correspond to one I/O circuit 220 and are coupled to the column pass gate circuit 160. According to the above described structure, odd-numbered data bits respectively latched in odd-numbered sense amplifiers of the sense amplifier circuit 140 are sequentially transferred to the error correction circuit 200_odd via the column pass gate circuit 160. Even-numbered data bits respectively latched in even-numbered sense amplifiers thereof are sequentially transferred to the error correction circuit 200_even via the column pass gate circuit 160. The respective error correction circuits 200_odd and 200_even are configured the same as the first embodiment and perform the same function as the first embodiment.

Figure 11:
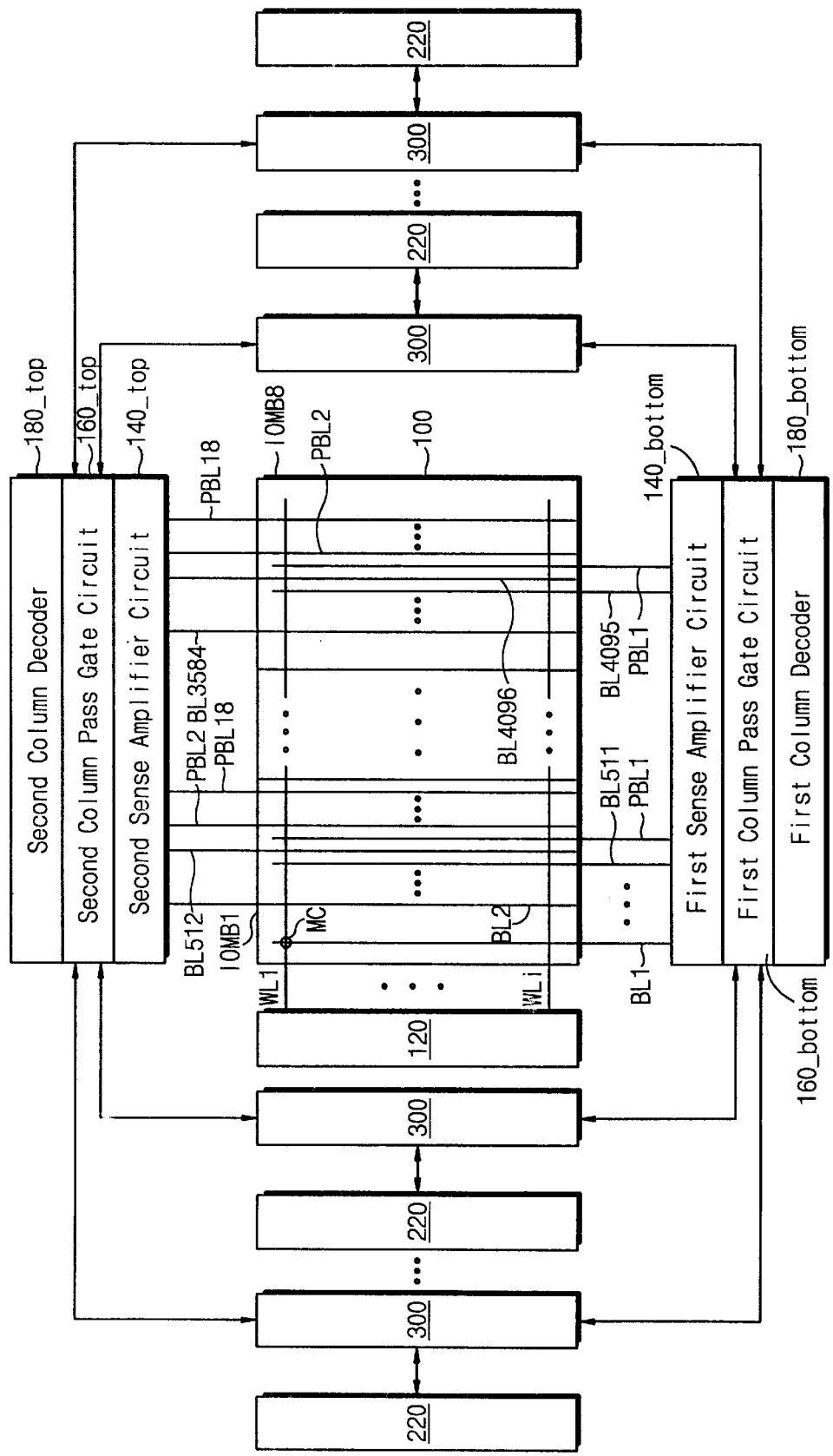
FIG. 11 is a block diagram of a third embodiment of the semiconductor memory device according to the present invention.

FIG. 11 is a third embodiment of a semiconductor memory device according to the present invention. In FIG. 11, the constituent elements that are identical to those of FIG. 4 are labeled with the same or like reference numerals. The semiconductor memory device, for example, a flash memory device comprises a memory cell array 100, a row decoder circuit 120, a first and a second sense amplifier circuit 140_bottom and 140_top, a first and a second column pass gate circuit 160_bottom and 160_top, and a first and a second column decoder circuit 180_bottom and 180_top, which perform the same function as the first embodiment, respectively. Thus, description thereof is omitted in order to avoid the repeated explanation.

Figure 12:
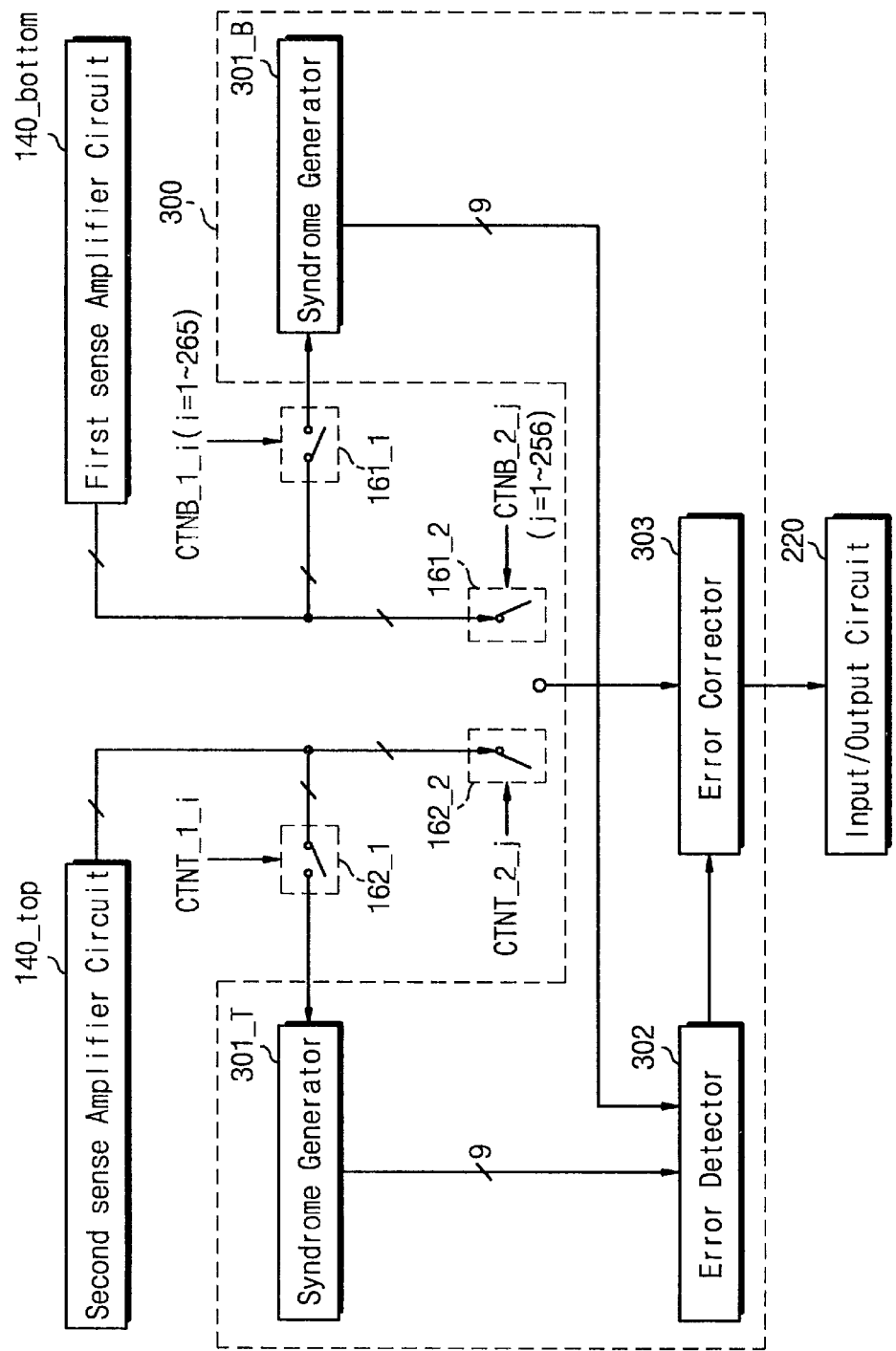
FIG. 12 is a block diagram of a preferred embodiment of the error correction circuit shown in FIG. 11.

The flash memory device of FIG. 11 comprises eight error correction circuits 300 corresponding to I/O circuits 220. A preferred embodiment of each error correction circuit 300 according to the present invention is illustrated in FIG. 12. In FIG. 12, for ease of illustration, the first column pass gate circuit 160_bottom is symbolized by switch circuits 161_1 and 161_2 that perform their switch operations according to corresponding control signals CTNB_1_i (i=1–256) and CTNB_2_j (j=1–256). Similarly, the second column pass gate circuit 160_top is symbolized by switch circuits 162_1 and 162_2 that perform their switch operations in accordance with corresponding control signals CTNT_1_i and CTNT_2_j, respectively. The symbols _1 and _2 indicate the first cycle and the second cycle, respectively. The control signals CTNB_1_i, CTNB_2_j, CTNT_1_i and CTNT_2_j change in the same manner as illustrated in FIG. 9.

As illustrated in FIG. 12, the error correction circuit 300 comprises two syndrome generators 301_B and 301_T, an error detector 302 and an error corrector 303. The syndrome generator 301_B sequentially receives 256 odd-numbered data bits and 9 odd-numbered check bits via the switch circuit 161_1 during the first cycle and then generates a first set of syndrome bits used as an address indicating an error place of the odd-numbered data bits. The syndrome generator 301_T sequentially receives 256 even-numbered data bits and 9 even-numbered check bits via the switch circuit 162_1 during the first cycle and then generates a second set of syndrome bits used as an address indicating an error place of the even-numbered data bits.

The error detector 302 is commonly coupled to the syndrome generators 301_B and 301_T. The error detector 302 alternatively receives the first and the second set of syndrome bits from the syndrome generators 301_B and 301_T. The error detector 302 alternatively decodes the first set of syndrome bits thus received to detect an error in the odd-numbered data bits and the second set of syndrome bits thus received to detect an error in the even-numbered data bits. The error detector 302 alternatively outputs a first signal indicative of the presence or absence of the error in the odd-numbered data bits and a second signal indicative of the presence or absence of the error in the even-numbered data bits.

During the second cycle, the error corrector 303 alternatively receives the 256 data bits from the first sense amplifier circuit 140_bottom through the switch circuit 161_2 and the 256 data bits from the second sense amplifier circuit 140_top through the switch circuit 162_2, and then corrects an error of the odd-numbered data bits responsive to the first signal from the error detector 302 and an error of the even-numbered data bits in response to the second signal from the error detector 302.

The third embodiment of the present invention operates as follows. For simplicity, the error correcting operation associated with the error correction circuit 300 corresponding to only one input/output memory block IOMB1 will be described below. Other correction circuits 300 operate similarly.

During the first cycle, 256 odd-numbered data bits and 9 odd-numbered check bits are latched in the first sense amplifier circuit 140_bottom, and 256 even-numbered data bits and 9 even-numbered check bits are latched in the second sense amplifier 140_top. As control signals CTNB_1_1 and CTNT_1_1 are simultaneously pulsed, an odd-numbered data bit in the first sense amplifier circuit 140_bottom and an even-numbered data bit in the second sense amplifier circuit 140_top are simultaneously applied to the syndrome generators 301_B and 301_T. Remaining odd-numbered and even-numbered data and check bits are applied to the corresponding syndrome generators 301_B and 301_T via the switch circuits 161_1 and 162_1 in similar manner as above described. A first set of syndrome bits corresponding to the odd-numbered data bits are generated from the syndrome generator 301_B and a second set of syndrome bits are generated from the syndrome generator 301_T. During the first cycle, the switch circuits 161_2 and 162_2 do not operate because all of the control signals CTNB_2_j and CTNT_2_j remain low as illustrated in FIG. 8.

During the second cycle, when a control signal CTNB_2_1 transitions from a logic low level to a logic high level, an odd-numbered data bit is applied from the first sense amplifier circuit 140_bottom to the error corrector 303 via the switch circuit 161_2. At the same time, the first signal indicating whether the odd-numbered data bit is erroneous, is applied to the error corrector 203 from the error detector 302. The error detector 302 decodes the first set of syndrome bits from the syndrome generator 301_B. The odd-numbered data bit currently applied to the error corrector 303 is outputted into the corresponding I/O circuit 220 either after the error correction or without the error correction responsive to the logic state of the first signal from the error detector 302.

As illustrated in FIG. 8, when a control signal CTNB_2_1 transitions from a logic high level to a logic low level and a control signal CTNT_2_1 transitions from a logic low level to a logic high level, an even-numbered data bit is applied to the error corrector 303 via the switch circuit 162_2. At the same time, the second signal indicating whether the even-numbered data bit is erroneous, is applied to the error corrector 303 from the error detector 302. The error detector 302 decodes the second set of syndrome bits from the syndrome generator 301_T. The even-numbered data bit currently applied to the error corrector 303 are outputted into the corresponding I/O circuit 220 either after the error correction or without the error correction in accordance with a logic state of the second signal from the error detector 302.

The first set of syndrome bits will be right-shifted in the corresponding syndrome generator 301 in order to generate a signal indicating whether a next odd-numbered data bit is erroneous. Similarly, the second set of syndrome bits will be right-shifted in the corresponding syndrome generator 301 in order to generate a signal indicating whether a next even-numbered data bit is erroneous. The above explained error correction operation will be performed repeatedly in association with remaining odd-numbered and even-numbered data bits (description thereof is omitted).

According to the third embodiment of the present invention, the time required for the first cycle corresponds to 256 clock cycles compared with 530 clock cycles in the conventional flash memory device. During the first cycle, an access time of the flash memory device with the on-chip ECC is reduced by half of that according to the conventional flash memory device. Furthermore, an 1-bit error in the odd-numbered data bits and an 1-bit error in the even-numbered data bits are corrected through the error correction circuit 300. Thus, 2-bit error of 512 data bits are corrected which are read out from one I/O memory block.

Figure 13:
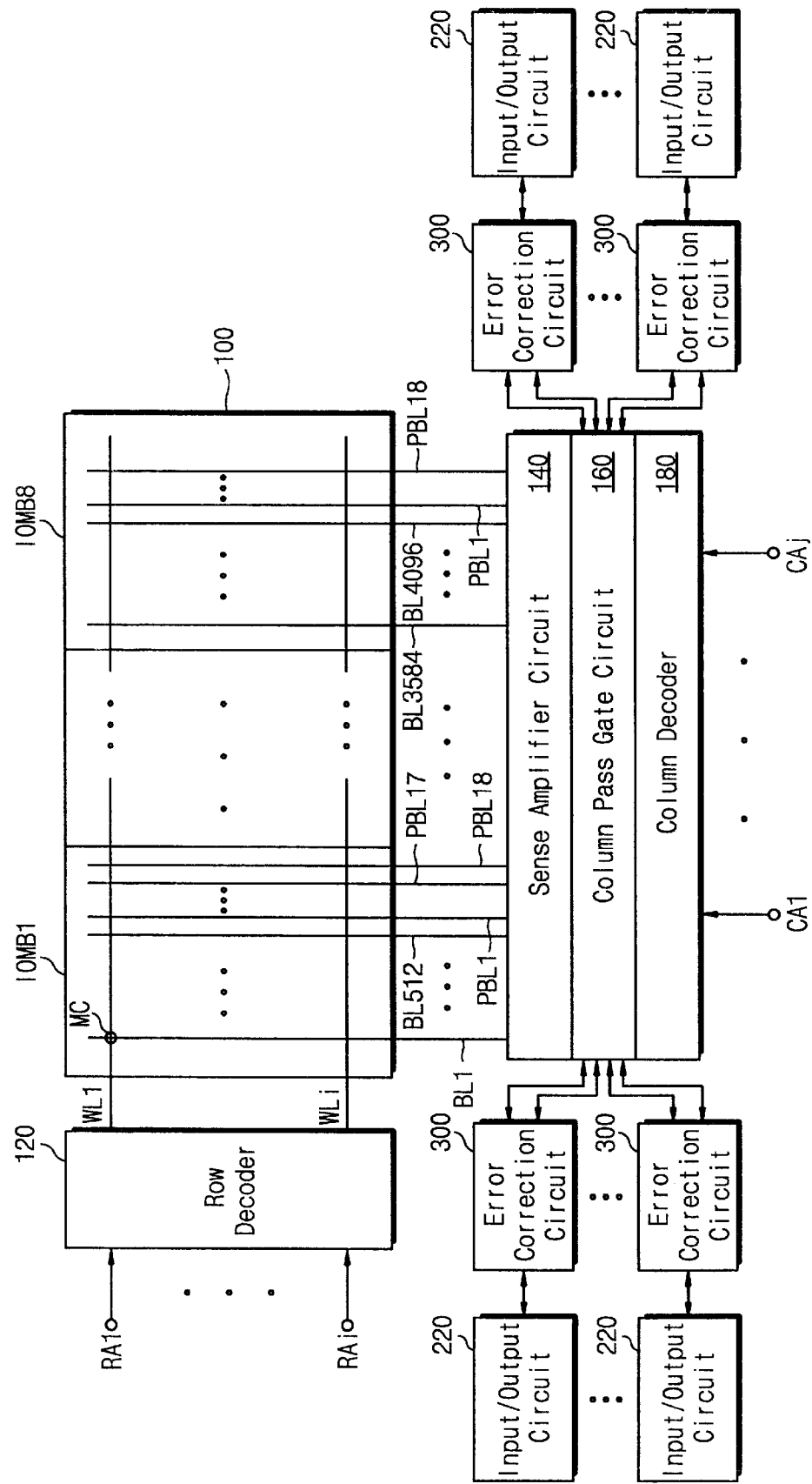
FIG. 13 is a block diagram of a fourth embodiment of the semiconductor memory device according to the present invention.
Figure 14:
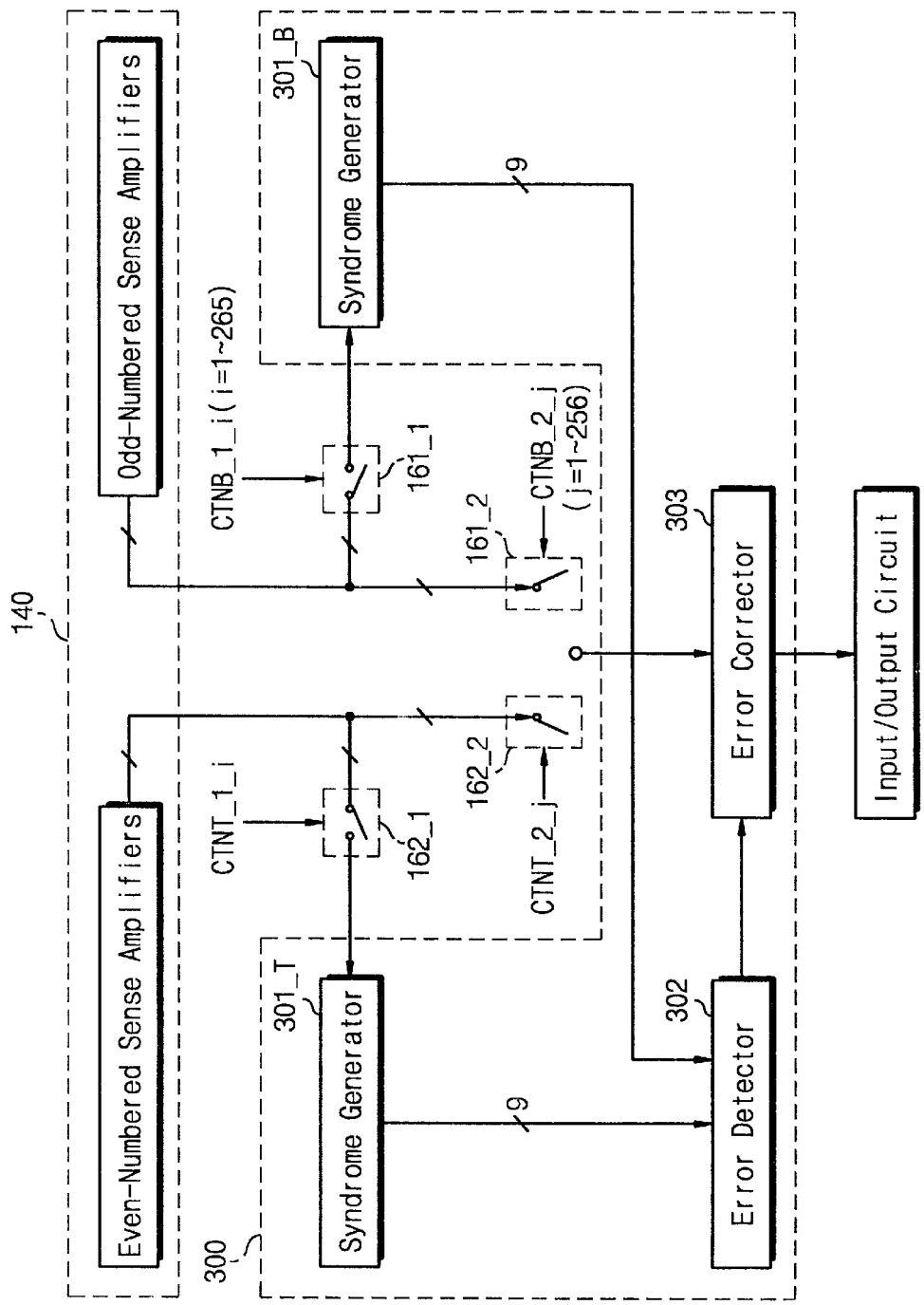
FIG. 14 is a block diagram of a preferred embodiment of the error correction circuit shown in FIG. 13.

FIG. 13 is a fourth embodiment of the semiconductor memory device according to the present invention. In FIG. 13, the constituent elements that are identical to those of FIG. 11 are labeled with the same or like reference numerals. The fourth embodiment illustrated in FIG. 13 differs from the third embodiment of FIG. 11 only in that a sense amplifier circuit 140, a column pass, gate circuit 160, and a column decoder circuit 180 are disposed at a bottom side of the memory cell array 100. Similarly to the third embodiment, one error correction circuits 300 is provided so as to correspond to one I/O circuit 220 and is coupled to the column pass gate circuit 160. As illustrated in FIG. 14 which is a preferred embodiment of an error correction circuit 300 illustrated in FIG. 13, the error correction circuit 300 has the same configuration as the third embodiment of FIG. 12 and also performs the same function as the third embodiment. Thus, the description of the fourth embodiment is omitted. As a result, the fourth embodiment has the same effects as the third embodiment of FIG. 11.

Having illustrated and described the principals of my invention in a preferred embodiment thereof, it should be readily apparent to those skilled in the art that the invention can be modified in arrangement and detail without departing from such principals. I claim all modifications coming within the spirit and scope of the accompanying claims.

What is claimed is:

1. A semiconductor memory device comprising:
    a memory cell array for storing a plurality of data bits and a plurality of check bits corresponding to the plurality of data bits, the plurality of data bits being divided into at least a first and second data groups and the plurality of check bits being divided into at least first and second check bit groups;

means for reading out the first data group and the first check bit group from the memory cell array;

means for reading out the second data group and second check bit group from the memory cell array;

means for correcting a first error in the first data group;

means for correcting a second error in the second data group; and input/output circuit for outputting the first and second data groups alternatively outputted from the means for correcting the first and second errors;

wherein the means for correcting a first error sequentially receives the first data group and the first check bit group;

wherein the means for correcting a second error sequentially receives the second data group and the second check bit group simultaneously with the means for correcting a first error sequentially receiving the first data group and the first check bit group;

wherein the means for correcting a first and second errors generates first and second syndromes respectively corresponding to the first and the second data group; and wherein the means for correcting a first and second errors corrects the first error in the first data group and the second error in the second data group responsive to the first and the second syndromes, respectively;

wherein the means for correcting a first error and the means for correcting a second error comprise:

a first syndrome generator for sequentially receiving the first data group and the first check bit group and generating first syndrome bits responsive thereto;

a second syndrome generator for sequentially receiving the second data group and the second check bit group and generating second syndrome bits responsive thereto;

a detector for alternatively receiving the first and the second syndrome bits from the first and the second syndrome generator, decoding the first syndrome bits to detect the first error in the first data group and the second syndrome bits to detect the second error in the second data group and generating a first signal indicative of the presence or absence of the first error and a second signal indicative of the presence or absence of the second error; and a corrector for alternatively receiving the first and second data groups, the corrector correcting the first error in the first data group responsive to the first signal indicative of the presence or absence of the first error and the second error in the second data group responsive to the second signal indicative of the presence or absence of the second error.

2. The semiconductor memory device of claim 1 wherein the corrected data bits of the first and the second group are alternatively externally provided through the input/output circuit.

3. A semiconductor memory device, comprising:

a memory cell array for storing a plurality of data bits and a plurality of check bits corresponding to the plurality of data bits, the plurality of data bits being divided into at least a first and a second data groups and the plurality of check bits being divided into at least first and second check bit groups;

a read circuit for reading out the plurality of data bits and the plurality of check bits from the memory cell array;

an input/output circuit for externally inputting/outputting the plurality of data bits and the plurality of check bits;

a first syndrome generator for sequentially receiving the first data group and the first check bit group and generating first syndrome bits responsive thereto;

a second syndrome generator for sequentially receiving the first data group and the first check bit group and generating second syndrome bits responsive thereto substantially simultaneously as the first syndrome generator sequentially receives the first data group and the first check bit group;

a detector for alternatively receiving the first and the second syndrome bits from the first and the second syndrome generator, decoding the first syndrome bits to detect the first error in the first data group and the second syndrome bits to detect the second error in the second data group, and generating a first signal indicative of the presence or absence of the first error and a second signal indicative of the presence or absence of the second error; and a corrector for alternatively receiving the first and second data groups, correcting the first error in the first data group responsive to the first signal indicative of the presence or absence of the first error and the second error in the second data group responsive to the second signal indicative of the presence or absence of the second error, wherein the first and second data groups respectively corrected by the corrector are alternatively externally provided through the input/output circuit.

4. A semiconductor memory device, comprising:

a memory cell array divided into a plurality of input/output memory blocks, each of the input/output memory blocks storing a plurality of data bits and a plurality of check bits corresponding to the plurality of data bits;

a plurality of input/output circuits corresponding to the plurality of the input/output memory blocks;

a read circuit for reading out the plurality of data and check bits from each input/output memory block;

means for correcting an error in the data bits read out from each input/output memory block comprising a plurality of error correction sections respectively corresponding to the input/output circuits, each of the error correction sections comprising a first error correction circuit for correcting a first error in odd-numbered data bits read out from a corresponding input/output memory block and a second error correction circuit for correcting a second error in even-numbered data bits read out from the corresponding input/output memory block;

wherein the first error correction circuit comprises:

a first syndrome generator for sequentially receiving odd-numbered data and check bits read out from the corresponding input/output memory block, to generate first syndrome bits responsive thereto;

a first detector for decoding the first syndrome bits to detect the first error in the odd-numbered data bits and generating a first signal indicative of the presence or absence of the first error; and a first corrector for sequentially receiving the odd-numbered data bits and correcting the first error in the odd-numbered data bits responsive to the first signal indicative of the presence or absence of the first error; and wherein the second error correction circuit comprises:
- a second syndrome generator for sequentially receiving even-numbered data and check bits read out from the corresponding input/output memory block substantially simultaneously as the first syndrome generator sequentially receives the odd-numbered data and check bits, to generate second syndrome bits responsive thereto;
- a second detector for decoding the second syndrome bits to detect the first error in the even-numbered data bits and generating a second signal indicative of the presence or absence of the second error; and
- a second corrector for sequentially receiving the even-numbered data bits, and correcting the second error in the even-numbered data bits responsive to the second signal indicative of the presence or absence of the second error.

5. A semiconductor memory device, comprising:
- a memory cell array divided into a plurality of input/output memory blocks, each of the input/output memory blocks storing a plurality of data bits and a plurality of check bits corresponding to the plurality of data bits;
- a plurality of input/output circuits corresponding to the input/output memory blocks of the plurality;
- a read circuit for reading out the data and check bits from each input/output memory block;
- means for correcting an error in the plurality of data bits read out from each input/output memory block, the means for correcting comprising a plurality of error correction sections respectively corresponding to the input/output circuits;

wherein each of the error correction sections comprises:
- a first syndrome generator for sequentially receiving odd-numbered data and check bits read out from a corresponding input/output memory block and generating first syndrome bits responsive thereto;
- a second syndrome generator for sequentially receiving even-numbered data and check bits read out from the corresponding input/output memory block substantially simultaneously as the first syndrome generator sequentially receives the odd-numbered data and check bits and generating second syndrome bits responsive thereto;
- a detector for alternatively receiving the first and the second syndrome bits from the first and the second syndrome generator, decoding the first syndrome bits to detect a first error in the odd-numbered data bits and the second syndrome bits to detect a second error in the even-numbered data bits, and generating a first signal indicative of the presence or absence of the first error and a second signal indicative of the presence or absence of the second error; and
- a corrector for alternatively receiving the odd-numbered data bits and the even-numbered data bits, the corrector correcting the first error in the odd-numbered data bits responsive to the first signal indicative of the presence or absence of the first error and the second error in the even-numbered data bits responsive to the second signal indicative of the presence or absence of the second error.

* * * * *

UNITED STATES PATENT AND TRADEMARK OFFICE
CERTIFICATE OF CORRECTION

PATENT NO. : 6,510,537 B1
DATED : January 21, 2003
INVENTOR(S) : Lee

It is certified that error appears in the above-identified patent and that said Letters Patent is hereby corrected as shown below:

Column 2,
Line 27, "used in NANID flash" should read -- used in NAND flash --.
Line 51, "the 8 I/0 memory" should read -- the 8 I/O memory --.

Column 6,
Line 10, "first. sense" should read -- first sense --.

Column 8,
Line 20, "pass ate circuit" should read -- pass gate circuit --.

Column 10,
Line 13, "the. error detector" should read -- the error detector --.
Line 28, "the IPO memory" should read -- the I/O memory --.

Column 12,
Line 60, "301_T. an" should read -- 301_T, an --.

Column 14,
Line 44, "Column pass, gate" should read -- column pass gate --.

Signed and Sealed this

Fifteenth Day of June, 2004

JON W. DUDAS
*Acting Director of the United States Patent and Trademark Office*